(12) United States Patent
Latchman

(10) Patent No.: US 12,375,176 B2
(45) Date of Patent: Jul. 29, 2025

(54) OPTIMAL EQUALIZATION PARTITIONING WITH AUTOMATIC GAIN ADJUSTMENT

(71) Applicant: MACOM Technology Solutions Holdings, Inc., Lowell, MA (US)

(72) Inventor: Ryan Latchman, Irvine, CA (US)

(73) Assignee: MACOM Technology Solutions Holdings, Inc., Lowell, MA (US)

( * ) Notice: Subject to any disclaimer, the term of this patent is extended or adjusted under 35 U.S.C. 154(b) by 25 days.

(21) Appl. No.: 18/424,600

(22) Filed: Jan. 26, 2024

(65) Prior Publication Data

US 2024/0171277 A1 May 23, 2024

Related U.S. Application Data

(63) Continuation of application No. 18/096,503, filed on Jan. 12, 2023, which is a continuation of application (Continued)

(51) Int. Cl.
*H04B 10/2507* (2013.01)
*H04B 10/2575* (2013.01)
(Continued)

(52) U.S. Cl.
CPC . *H04B 10/25073* (2013.01); *H04B 10/25759* (2013.01); *H04L 27/01* (2013.01);
(Continued)

(58) Field of Classification Search
None
See application file for complete search history.

(56) References Cited

U.S. PATENT DOCUMENTS

| 4,534,064 A | 8/1985 | Giacometti et al. |
| 4,545,078 A | 10/1985 | Wiedeburg |

(Continued)

FOREIGN PATENT DOCUMENTS

| CN | 206945133 U | 1/2018 |
| CN | 208433969 U | 1/2019 |

(Continued)

OTHER PUBLICATIONS

French National Institute of Industrial Property ("INPI") Preliminary Report issued for Application No. FR191046 on Jun. 19, 2020.
(Continued)

*Primary Examiner* — Darren E Wolf
(74) *Attorney, Agent, or Firm* — Jason H. Vick; Amped IP LLC

(57) ABSTRACT

An optical module configured to electrically connect to a host. A linear equalizer performs equalization on a host equalized signal to create a module equalized signal, and a driver configured to present the module equalized signal from the linear equalizer to an optical conversion device at a magnitude suitable for the optical conversion device. An optical conversion device receives the module equalized signal from the driver, converts the module equalized signal to an optical signal, and transmit the optical signal over an optical channel. Also part of the optical module is an interface which communicates supplemental equalizer settings to the host. A memory stores the supplemental equalizer settings which reflect the optical modules effect on a signal passing through the optical module. A controller oversees communication of the supplemental equalizer settings to the host such that the host uses the supplemental equalizer settings to modify host equalizer settings.

20 Claims, 11 Drawing Sheets

Related U.S. Application Data

No. 17/501,811, filed on Oct. 14, 2021, now Pat. No. 11,575,437, which is a continuation-in-part of application No. 17/144,428, filed on Jan. 8, 2021, now Pat. No. 11,438,064.

(60) Provisional application No. 63/076,863, filed on Sep. 10, 2020, provisional application No. 62/959,744, filed on Jan. 10, 2020.

(51) Int. Cl.
  H04B 10/50 (2013.01)
  H04L 27/01 (2006.01)
  *H04B 10/077* (2013.01)
  *H04B 10/2543* (2013.01)
  *H04B 10/40* (2013.01)
  *H04B 10/60* (2013.01)

(52) U.S. Cl.
  CPC ...... *H04B 10/0775* (2013.01); *H04B 10/2543* (2013.01); *H04B 10/40* (2013.01); *H04B 10/50* (2013.01); *H04B 10/60* (2013.01)

(56) References Cited

U.S. PATENT DOCUMENTS

| | | |
|---|---|---|
| 4,687,924 A | 8/1987 | Galvin et al. |
| 4,734,914 A | 3/1988 | Yoshikawa |
| 4,747,091 A | 5/1988 | Doi |
| 4,849,998 A | 7/1989 | Poklemba |
| 4,864,649 A | 9/1989 | Tajima et al. |
| 5,019,769 A | 5/1991 | Levinson |
| 5,039,194 A | 8/1991 | Block et al. |
| 5,047,835 A | 9/1991 | Chang |
| 5,057,932 A | 10/1991 | Lang |
| 5,194,828 A | 3/1993 | Kato et al. |
| 5,210,712 A | 5/1993 | Saito |
| 5,289,302 A | 2/1994 | Eda |
| 5,293,405 A | 3/1994 | Gersbach et al. |
| 5,334,826 A | 8/1994 | Sato et al. |
| 5,383,046 A | 1/1995 | Tomofuji et al. |
| 5,383,208 A | 1/1995 | Queniat |
| 5,392,273 A | 2/1995 | Masaki et al. |
| 5,394,416 A | 2/1995 | Ries |
| 5,396,059 A | 3/1995 | Yeates |
| 5,448,629 A | 9/1995 | Bosch et al. |
| 5,471,501 A | 11/1995 | Parr et al. |
| 5,488,627 A | 1/1996 | Hardin et al. |
| 5,510,924 A | 4/1996 | Terui et al. |
| 5,557,437 A | 9/1996 | Sakai et al. |
| 5,557,468 A * | 9/1996 | Ip .................. H04B 10/25133 359/615 |
| 5,574,435 A | 11/1996 | Mochizuki et al. |
| 5,594,748 A | 1/1997 | Jabr |
| 5,636,254 A | 6/1997 | Hase et al. |
| 5,796,501 A | 8/1998 | Sotom et al. |
| 5,812,572 A | 9/1998 | King et al. |
| 5,822,099 A | 10/1998 | Takamatsu |
| 5,844,928 A | 12/1998 | Shastri et al. |
| 5,926,303 A | 7/1999 | Giebel et al. |
| 5,943,152 A | 8/1999 | Mizrahi et al. |
| 5,953,690 A | 9/1999 | Lemon et al. |
| 5,956,168 A | 9/1999 | Levinson et al. |
| 5,963,901 A | 10/1999 | Vahatalo et al. |
| 6,010,538 A | 1/2000 | Sun et al. |
| 6,014,241 A | 1/2000 | Winter et al. |
| 6,020,593 A | 2/2000 | Chow et al. |
| 6,021,947 A | 2/2000 | Swartz |
| 6,023,147 A | 2/2000 | Cargin, Jr. et al. |
| 6,049,413 A | 4/2000 | Taylor et al. |
| 6,064,501 A | 5/2000 | Roberts et al. |
| 6,108,113 A | 8/2000 | Fee |
| 6,111,687 A | 8/2000 | Tammela |
| 6,111,712 A | 8/2000 | Vishakhadatta et al. |
| 6,115,113 A | 9/2000 | Flockencier |
| H1881 H | 10/2000 | Davis et al. |
| 6,160,647 A | 12/2000 | Gilliland et al. |
| 6,175,434 B1 | 1/2001 | Feng |
| 6,259,293 B1 | 7/2001 | Hayase et al. |
| 6,282,017 B1 | 8/2001 | Kinoshita |
| 6,292,497 B1 | 9/2001 | Nakano |
| 6,317,062 B1 | 11/2001 | Payer et al. |
| 6,341,360 B1 | 1/2002 | Abdelilah et al. |
| 6,366,373 B1 | 4/2002 | MacKinnon et al. |
| 6,388,784 B1 | 5/2002 | Nakamura et al. |
| 6,438,450 B1 | 8/2002 | DiLorenzo |
| 6,445,662 B1 | 9/2002 | Tonami |
| 6,452,719 B2 | 9/2002 | Kinoshita |
| 6,494,370 B1 | 12/2002 | Sanchez |
| 6,556,601 B2 | 4/2003 | Nagata |
| 6,570,944 B2 | 5/2003 | Best et al. |
| 6,580,328 B2 | 6/2003 | Tan et al. |
| 6,661,940 B2 | 12/2003 | Kim |
| 6,707,492 B1 | 3/2004 | Itani |
| 6,707,600 B1 | 3/2004 | Dijaili et al. |
| 6,738,578 B1 | 5/2004 | Mihota |
| 6,740,864 B1 | 5/2004 | Dries |
| 6,801,555 B1 | 10/2004 | DiJaili et al. |
| 6,837,625 B2 | 1/2005 | Schott et al. |
| 6,852,966 B1 | 2/2005 | Douma et al. |
| 6,868,104 B2 | 3/2005 | Stewart et al. |
| 6,888,123 B2 | 5/2005 | Douma et al. |
| 6,909,731 B2 | 6/2005 | Lu |
| 6,934,307 B2 | 8/2005 | DeCusatis et al. |
| 6,934,479 B2 | 8/2005 | Sakamoto et al. |
| 6,941,077 B2 | 9/2005 | Aronson et al. |
| 6,952,531 B2 | 10/2005 | Aronson et al. |
| 6,956,643 B2 | 10/2005 | Farr et al. |
| 6,957,021 B2 | 10/2005 | Aronson et al. |
| 6,967,320 B2 | 11/2005 | Chieng et al. |
| 7,031,574 B2 | 4/2006 | Huang et al. |
| 7,039,082 B2 | 5/2006 | Stewart et al. |
| 7,046,721 B2 | 5/2006 | Grohn |
| 7,050,720 B2 | 5/2006 | Aronson et al. |
| 7,058,310 B2 | 6/2006 | Aronson et al. |
| 7,066,746 B1 | 6/2006 | Togami et al. |
| 7,079,775 B2 | 7/2006 | Aronson et al. |
| 7,184,671 B2 | 2/2007 | Wang |
| 7,215,891 B1 | 5/2007 | Chiang et al. |
| 7,227,916 B2 | 6/2007 | Ruelke et al. |
| 7,236,108 B2 | 6/2007 | Cheng |
| 7,265,334 B2 | 9/2007 | Draper et al. |
| 7,276,682 B2 | 10/2007 | Draper et al. |
| 7,381,935 B2 | 6/2008 | Sada et al. |
| 7,456,690 B2 | 11/2008 | Kocaman |
| 7,505,498 B2 | 3/2009 | Sanchez |
| 7,701,833 B2 | 4/2010 | Kim |
| 7,734,309 B2 | 6/2010 | Chi et al. |
| 7,949,025 B2 | 5/2011 | Olea |
| 7,978,012 B2 | 7/2011 | Wood |
| 8,213,494 B2 | 7/2012 | Hidaka |
| 8,396,110 B1 | 3/2013 | Hsieh |
| 8,611,403 B1 * | 12/2013 | Ding .................. G06F 1/3206 375/219 |
| 8,861,578 B1 | 10/2014 | Lusted et al. |
| 8,948,614 B1 | 2/2015 | Schmidt |
| 8,995,514 B1 | 3/2015 | Asuncion et al. |
| 9,231,803 B2 | 1/2016 | Nishi |
| 9,397,868 B1 | 7/2016 | Hossain et al. |
| 9,419,746 B1 * | 8/2016 | Baeckler .............. H04L 1/0001 |
| 9,559,880 B1 | 1/2017 | Cirit et al. |
| 9,853,735 B1 | 12/2017 | Lin |
| 9,853,839 B2 | 12/2017 | Beukema et al. |
| 9,882,703 B1 | 1/2018 | Xu |
| 9,906,232 B1 | 2/2018 | Cho |
| 10,333,692 B2 | 6/2019 | Miura |
| 10,404,496 B1 | 9/2019 | Azenkot |
| 10,461,967 B1 | 10/2019 | Ahmed et al. |
| 11,438,064 B2 | 9/2022 | Latchman |
| 11,575,437 B2 | 2/2023 | Latchman |
| 12,126,381 B2 | 10/2024 | Latchman |
| 2002/0012152 A1 | 1/2002 | Agazzi |
| 2002/0097467 A1 | 7/2002 | Terahara et al. |

(56) References Cited

U.S. PATENT DOCUMENTS

| | | |
|---|---|---|
| 2002/0105982 A1 | 8/2002 | Chin et al. |
| 2002/0144038 A1* | 10/2002 | Smith .................. G06F 13/374 |
| | | 710/240 |
| 2003/0165168 A1 | 9/2003 | Murata |
| 2004/0001538 A1 | 1/2004 | Garrett |
| 2004/0047635 A1 | 3/2004 | Aronson et al. |
| 2004/0136727 A1 | 7/2004 | Androni et al. |
| 2004/0188717 A1 | 9/2004 | Ono |
| 2004/0208526 A1 | 10/2004 | Mibu |
| 2005/0186918 A1 | 8/2005 | Ramet et al. |
| 2005/0215090 A1 | 9/2005 | Harwood |
| 2005/0226355 A1 | 10/2005 | Kibune et al. |
| 2006/0001494 A1 | 1/2006 | Garlepp et al. |
| 2006/0098699 A1 | 5/2006 | Sanchez |
| 2006/0126683 A1 | 6/2006 | Kang |
| 2006/0153256 A1 | 7/2006 | Sanchez |
| 2006/0165139 A1 | 7/2006 | Sanchez |
| 2007/0014344 A1 | 1/2007 | Maangat |
| 2007/0160173 A1 | 7/2007 | Takeuchi |
| 2007/0280388 A1 | 12/2007 | Torre |
| 2008/0111597 A1 | 5/2008 | Cranford et al. |
| 2008/0265998 A1 | 10/2008 | Wood |
| 2008/0267633 A1 | 10/2008 | Weem et al. |
| 2008/0290953 A1 | 11/2008 | Sandner et al. |
| 2008/0304559 A1 | 12/2008 | Wu |
| 2009/0141774 A1 | 6/2009 | Araki et al. |
| 2009/0202256 A1* | 8/2009 | Chen ..................... H01S 5/0687 |
| | | 372/38.02 |
| 2009/0244375 A1 | 10/2009 | Moehlmann et al. |
| 2010/0046598 A1* | 2/2010 | Zhong ............... H04L 25/03057 |
| | | 375/233 |
| 2010/0074615 A1 | 3/2010 | Kondo |
| 2011/0032013 A1 | 2/2011 | Nelson et al. |
| 2012/0002712 A1 | 1/2012 | Hayami |
| 2012/0038400 A1 | 2/2012 | Talaga, Jr. |
| 2012/0321325 A1 | 12/2012 | Greshishchev et al. |
| 2013/0022309 A1 | 1/2013 | Yu |
| 2013/0156443 A1 | 6/2013 | Lowery |
| 2013/0287394 A1 | 10/2013 | Chaahoub |
| 2015/0180587 A1 | 6/2015 | Kalogerakis et al. |
| 2015/0180642 A1 | 6/2015 | Hsieh et al. |
| 2015/0381393 A1 | 12/2015 | Kotagiri |
| 2016/0006589 A1 | 1/2016 | Kamali |
| 2016/0197680 A1 | 7/2016 | Li et al. |
| 2016/0254867 A1* | 9/2016 | Hayat .................. H04B 10/693 |
| | | 398/212 |
| 2016/0352557 A1 | 12/2016 | Liao |
| 2016/0380785 A1 | 12/2016 | Chung |
| 2017/0070370 A1 | 3/2017 | He et al. |
| 2017/0288369 A1 | 10/2017 | Ikram et al. |
| 2017/0288779 A1* | 10/2017 | Tatum .............. H04B 10/25073 |
| 2018/0062747 A1 | 3/2018 | Gupta |
| 2018/0159514 A1 | 6/2018 | Zerbe et al. |
| 2018/0288779 A1 | 10/2018 | Dai et al. |
| 2018/0294884 A1 | 10/2018 | Rope et al. |
| 2019/0207700 A1 | 7/2019 | Soto et al. |
| 2019/0243164 A1* | 8/2019 | Nelson ................. H03K 17/687 |
| 2020/0195475 A1 | 6/2020 | Lin |
| 2021/0168000 A1* | 6/2021 | Casper .................... H03F 3/193 |
| 2021/0242354 A1 | 8/2021 | Wang et al. |
| 2023/0141712 A1 | 5/2023 | Latchman |
| 2024/0421906 A1 | 12/2024 | Latchman |

FOREIGN PATENT DOCUMENTS

| | | |
|---|---|---|
| EP | 1471671 | 12/2004 |
| EP | 3500867 | 6/2019 |
| JP | 58140175 | 8/1983 |
| JP | 62124576 | 6/1987 |
| JP | 62235975 | 10/1987 |
| JP | 62281485 | 12/1987 |
| JP | 2008206170 | 9/2008 |
| KR | 1020050085785 | 8/2005 |
| KR | 1020100061753 | 6/2010 |
| KR | 101684801 | 12/2016 |
| KR | 10-2018-0122285 A | 11/2018 |
| KR | 1020170148184 | 12/2018 |
| KR | 1020180049784 | 5/2019 |
| TW | 201722101 A | 6/2017 |
| WO | WO 93/21706 | 10/1993 |
| WO | WO 02/063800 | 8/2002 |
| WO | WO 2004/061689 A2 | 7/2004 |
| WO | WO 2004/098100 | 11/2004 |
| WO | WO 2008/070138 | 6/2008 |
| WO | WO 2009/058529 A1 | 5/2009 |
| WO | WO 2018/080652 | 5/2018 |

OTHER PUBLICATIONS

International Search Report issued for PCT/US2020/055839 on Jan. 29, 2021.

International Search Report issued for PCT/US2020/050919 on Dec. 21, 2021.

International Search Report issued for Application No. PCT/US2020/051657 on Jan. 13, 2021.

Analog & Power, "An Introduction to clock distribution circuits", Alexander Pakosta, Texas Instruments, 2 pages, date unknown.

Texas Instruments, Application Report, "Using the CDCL6010 as a Frequency Synthesizer and Jitter Cleaner", Madhu Balasubramanian, SLLA259-Mar. 2007, Copyright © 2007, Texas Instruments Incorporated, 15 pages.

CDC7005, "3.3-V High Performance Clock Synthesizer and Jitter Cleaner", SCAS685J-December 2002-Revised Jul. 2008, Copyright © 2008, Texas Instruments Incorporated, 33 pgs.

P.M Crespo Bofill, G. Shing Liu, C. Ho Wei, Combine Baud-rate timing recovery and adaptive equalization for high rate data transmission in digial subscriber lines. In Comunicaciones de Telefonica y Desarollo, vol. 41, No. 7, Jun. 1993. http://www.tid.es/presencia/publicationes/comsid/esp/articulos/vol41/combi/combi.html.

International Search Report issued for PCT/US2021/012636 on May 4, 2021.

Frlan, Ed "OIF's CEI 56G Interfaces—Key Building Blocks for Optics in the 400G Data Center" Optical Internetworking Forum; Sep. 28, 2015.

Lumentum "QSFP28 Optical Transceiver—100 Gigabit Ethernet for Up to 10 km Reach—LQ2 Series" Available at https://sfp.by/source/manual/LQ210LR-CAP 1.pdf; Mar. 16, 2016.

Renesas "56G—Linear PAM4 DML Driver HXT44400 Short-Form Datasheet" Aug. 13, 2018.

Written Opinion for International Application No. PCT/US2021/012636, mailed May 4, 2021.

International Preliminary Report on Patentability for International Application No. PCT/US2021/012636, mailed Jul. 21, 2022.

First Office Action (Including Translation) for corresponding Chinese Patent Application No. 202180013780.1, mailed Oct. 26, 2023.

Notification of the Decision to Grant (Including Translation) for corresponding Chinese Patent Application No. 202180013780.1, mailed Mar. 28, 2024.

European Search Report for corresponding European Patent Application No. 21738612.7, mailed Jan. 9, 2024.

Office Action (Including Translation) for corresponding Taiwan Patent Application No. 110100887, mailed Jul. 17, 2024.

Office Action (Restriction Requirement) for U.S. Appl. No. 17/144,428, mailed Oct. 14, 2021.

Office Action for U.S. Appl. No. 17/144,428, mailed Feb. 2, 2022.

Notice of Allowance for U.S. Appl. No. 17/144,428, mailed Jun. 10, 2022.

Office Action for U.S. Appl. No. 17/894,966, mailed Jan. 30, 2024.

Notice of Allowance for U.S. Appl. No. 17/894,966, mailed Jul. 2, 2024.

Notice of Allowance for U.S. Appl. No. 17/501,811, mailed Oct. 5, 2022.

Office Action for U.S. Appl. No. 18/096,503, mailed Aug. 27, 2024.

Notice of Allowance for U.S. Appl. No. 18/096,503, mailed Mar. 3, 2025.

(56) References Cited

OTHER PUBLICATIONS

Notice of Allowance for U.S. Appl. No. 18/096,503, mailed Apr. 14, 2025.

* cited by examiner

| FIG. 4A | FIG. 4B |

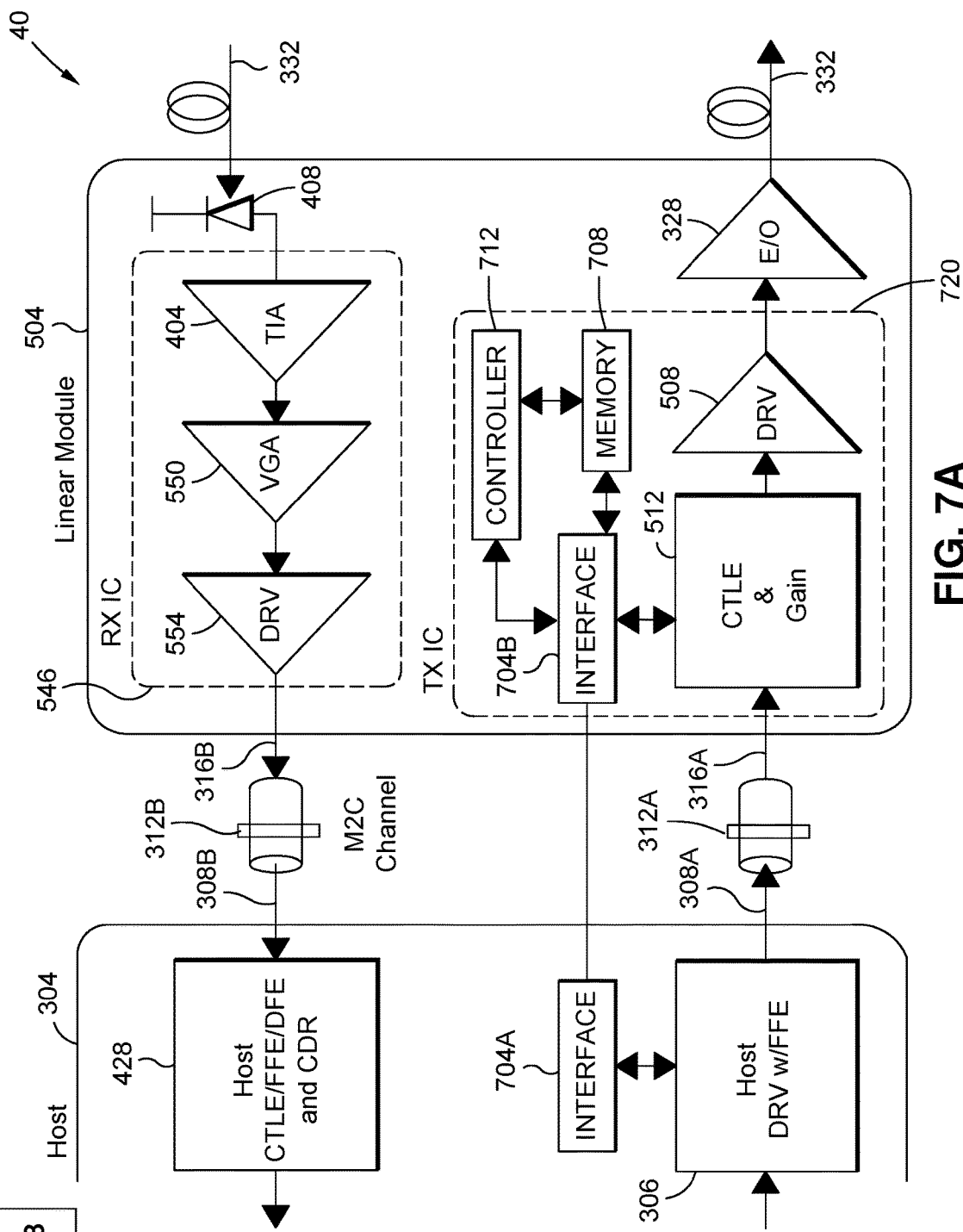

OPTIMAL EQUALIZATION PARTITIONING WITH AUTOMATIC GAIN ADJUSTMENT

CROSS REFERENCE TO RELATED APPLICATIONS

This application is a Continuation of U.S. patent application Ser. No. 18/096,503, filed Jan. 12, 2023, which is a Continuation of 17/501,811, filed Oct. 14, 2021, now U.S. Pat. No. 11,575,437, which is a Continuation-In-Part of U.S. patent application Ser. No. 17/144,428, filed Jan. 8, 2021, now U.S. Pat. No. 11,438,064, which claims the benefit of U.S. Provisional Patent Application No. 63/076,863, filed Sep. 10, 2020 and U.S. Provisional Patent Application No. 62/959,744, filed Jan. 10, 2020 each of which are incorporated herein by reference in their entirety.

1. FIELD OF THE INVENTION

This invention relates to optical communication system and in particular to optimal equalization partitioning between a host and optical module.

2. RELATED ART

Current state of the art architectures for data center and client side connectivity at 26 GBAUD and 53 GBAUD (50 Gb/s, 100 Gb/s, 200G, 400 Gb/s, and future 800 Gb/s) are architected assuming time domain equalization functionality (FFE/DFE) and retiming in both ASICs found on host PCBs as well as optical modules which connect to the host via connector and/or PCB trace loss. While there is a benefit for time domain equalization and retiming to appear at every hop of the link, it comes at a cost from a silicon area and power consumption point of view.

50G (26 GBAUD) and 100 Gb/s (53 GBAUD) PAM electrical signaling used in communication systems is very challenging due to loss introduced by PCB and/or connectors, non-ideal characteristics seen in host ASICs, optical components non-idealities and reduced SNR (signal to noise ratio) due to multilevel signaling. Due to these losses, host (routers, switches, NICs) electrical outputs are evaluated with CTLE and/or FFE and/or DFE equalizers built into scopes and simulation tools to ensure the signal can be recovered within optical modules. In actual implementation, the electrical receiver in the module would include equalizers, such as CTLE and/or FFE and/or DFE equalizers. Prior art module implementations have these equalizers on their front end and retiming functionality to reset the signal integrity budget before communicating the bit stream to downstream optical components (laser driver and/or laser/transmit optical subassembly). This presents as clean as possible signal from the optical module for communication from 1 m-10 km+ but resetting the signal integrity through retiming comes at a cost from a power consumption and chip area perspective. At the same time, the optical interface is also evaluated with a 5-tap FFE reference receiver to establish the expected link performance that would occur in the receiver when installed in the field for data communication. The evaluation occurs for 50G SR/FR/LR, 200G SR/FR/LR, 100G FR/DR and 400G DR4/FR4/LR4 based on the TDECQ metric, with future link types also likely to leverage time domain equalization.

Evaluating the host with equalization, then resetting the signal integrity budget through retiming in the optical module, followed by evaluating the optical signal again with equalization represents a redundancy in equalization which increases costs, size and power consumption to the overall system which is not necessary if the signal is kept linear in the module (avoid retiming and non-linear equalization in the module). This also holds true in the receive path, where optical modules currently integrate various forms of equalization (emulating the TDECQ reference equalizer) along with retiming functionality which provides the cleanest possible electrical signal for communicating to hosts in the receive path. Hosts ASIC receivers also integrate extensive equalization to compensate for trace loss and/or copper cable losses. Having non-linear equalization as well as retiming in the optical module, and also in the host ASIC receive path again represents a redundancy in equalization/retiming which increases costs, size and power consumption to the overall system which is not necessary if the signal is kept linear in the module (avoid retiming and non-linear equalization in the module).

A further drawback of the prior art, when the optic module is configured as a linear module, occurs because the host FFE is not optimized for signal path through the opic module. In the prior art, the FFE in the host 306 (FIG. 3) has coefficient values, also referred to as FFE settings selected to optimize the signal for point 316A. In prior art system, the non-linear module includes retiming features, such as a CDR, which restored the signal margin within the module 320 prior to transmission over the optic channel. However, linear modules do not include the retiming elements so the margin to the signal is not restored in the module.

FIG. 3 illustrates a non-linear module that includes the CDR 322 which retimes the signal prior to transmission over the optic cable. As can be seen, the non-linear module includes additional equalizer elements 324, 326. Compared to FIG. 4A, these elements are missing in the linear module 504. This results in the signal presented to the optic fiber channel 332 from a linear module having less margin than a signal presented to the fiber from a non-linear module. This leads to reduced bandwidth or a higher bit error rate.

SUMMARY

To overcome the drawbacks in the prior art and provide additional benefits, disclosed is a modified optic module design which maintains a linear processing path/elements and eliminates duplication of elements in relation to downstream processing apparatus. For example, evaluating the host with equalization, then resetting the signal integrity budget through retiming in the optical module, followed by evaluating the optical signal again with equalization represents a redundancy in equalization which increases costs, size and power consumption to the overall system which is not necessary if the signal is kept linear in the optic module (avoid retiming and non-linear equalization in the module). This also holds true in the receive path, where optical modules currently integrate various forms of equalization (emulating the TDECQ reference equalizer) along with retiming functionality which provides the cleanest possible electrical signal for communicating to hosts in the receive path. Hosts ASIC receivers also integrate extensive equalization to compensate for trace loss and/or copper cable losses. Having non-linear equalization as well as retiming in the optical module, and also in the host ASIC receive path again represents a redundancy in equalization/retiming which increases costs, size and power consumption to the overall system which is not necessary if the signal is kept linear in the optic module (avoid retiming and non-linear equalization in the module).

In one embodiment, a transceiver having a transmit path and receive path is disclosed. The transceiver comprises a host having one or more non-linear equalizers configured to perform non-linear equalization on an outgoing signal, an incoming signal, or both. A host to optic module channel electrically connects the host to an optic module. The optic module comprises a transmitter and a receiver. The transmitter comprises a linear equalizer configured to perform linear equalization on the outgoing signal to create an equalized signal, a driver configured to receive and output the equalized signal, an electrical to optical device configured to convert the equalized signal from the driver to an optical signal and transmit the optical signal over a fiber optic cable, such that the receive does not perform non-linear processing. The receiver comprises a photodetector configured to receive a received optic signal and convert the received optic signal to a received electrical signal, a linear amplifier configured to perform linear amplification on the received electrical signal to create amplified received signal, and a driver configured to send the amplified received signal over an optic module to host channel, such that the receive does not perform non-linear processing.

In one embodiment, the optic module includes a gain module (unit) configured to amplify the outgoing signal. The gain module (unit) may be part of the linear equalizer in the transmitter and the gain module (unit) is configured to perform linear amplification. It is contemplated that the optic module may not include a CDR configured to perform non-linear clock and data recovery. The optic module and host may also be configured to process received electrical signals and transmit electrical signal over an electrically conductive channel. It is further contemplated that the host may be configured to perform station to station training for link optimization due to the linear processing of the optic module. In one configuration the transceiver is part of an on-board optics configuration. The transceiver may be in an on-board optics configuration.

Also disclosed is a method for receiving and processing an optic signal to recover a transmitted signal. In one embodiment, this method includes receiving an optic signal at an optic module from a fiber optic cable such that the optic module is configured to only perform linear processing. Then converting the optic signal into an electrical signal and processing the electrical signal using linear processing before sending a processed electrical signal to a host. At the host, this method of operation performs non-linear processing on the processed electrical signal at the host to recover the transmitted signal.

It is contemplated that the optic module does not perform non-linear clock and data recovery. In addition, the non-linear processing by the host includes non-linear equalization. The optic module may be configured without an equalizer. This method may further comprise a method for transmitting an optic signal that comprises processing an outgoing electrical signal within the optic module using only linear processing.

Also disclosed is an optic module configured to receive and transmit optic signals. In one embodiment, the optic module includes a signal receive path configured to perform linear signal processing and a signal transmit path configured to perform linear processing on an outgoing signal. The signal receive path comprises a photodetector configured to receive a received optic signal and convert the received optic signal to a received electrical signal, a linear variable gain amplifier configured to amplify the received electrical signal to create an amplified signal, and an output port configured to provide the amplified signal to a host.

The signal transmit path is configured to perform linear processing on an outgoing signal. The signal transmit path comprises a linear equalizer configured to perform linear equalization on the outgoing signal received from the host to create an equalized signal, a driver configured to provide and drive an electrical to optical interface, and an electrical to optical interface configured to convert the equalized signal from the driver to an outgoing optic signal and transmit the outgoing optic signal on a fiber optic cable.

In one configuration, the signal transmit path further includes an amplifier. The system may further comprise a host with non-linear equalization is configured to perform equalization on the amplified signal and pre-compensation the outgoing signal. In one embodiment, the optic module does not include non-linear clock and data recovery. The optic module may be configured in an on-board optic configuration. The optic module may be configured in a co-packaged optic configuration.

Also disclosed herein is a module configured to electrically connect to a host. The module comprises a linear equalizer configured to perform linear equalization on the outgoing signal to create an equalized signal. Also included is a driver configured to receive and amplify the equalized signal. An electrical to optical device is configured to convert the equalized signal from the driver to an optical signal and transmit the optical signal over a fiber optic cable. A memory is configured to store supplemental FFE settings, while a low-speed interface is configured to communicate with the host. A controller is configured to control communication over the low-speed interface and communicate with the memory to communicate the supplemental FFE setting to the host.

In one embodiment the module is a linear module which does not perform signal re-timing. The low-speed interface may comprise an I2C interface or a SPI type interface. In one configuration, the supplemental FFE settings are generated during a module testing operation and stored in the memory. The supplemental FFE settings modify the host FFE settings to force the pre-distortion processing to also account for the module. It is contemplated that the controller may comprise one of a processor, microprocessor, microcontroller, or ASIC. In one embodiment, the supplemental FFE settings are calculated during a training process, when the module is connected to the host, and stored in the memory.

Also disclosed is a method for configuring a host FFE and processing a signal prior to transmission of the signal over a channel. The steps of this method include retrieving supplemental equalizer settings from a memory in a module and transmitting the supplemental equalizer settings to a host. The host receives the supplemental equalizer settings over a low-speed interface from the module. Then, modifying host equalizer settings based on the supplemental equalizer settings to create updated equalizer settings. Next, this method receives and processes an outgoing data signal with a host equalizer using the updated equalizer settings to create a host processed outgoing signal. Thereafter, this method receives and processes the host processed outgoing signal with the module to create a module processed outgoing signal. The processing by the module is linear and the processing by the host equalizer accounts for a signal path through the module.

In one embodiment, the module transmits an optic signal over an optic channel. It is contemplated that the module is configured to not perform clock and data recovery. The non-linear processing by the host may include non-linear equalization. The module may be configured to plug into a port of the host and communicate with the host over one or more electrically conductive channel. In addition, the supplemental equalizer settings may be generated during a testing phase or a training phase. This method may further comprise using a module temperature value to access a look-up table that associates supplemental equalizer settings with two or more different temperature values.

Also disclosed herein is an optic module configured to electrically connect to a host. In this embodiment, the optic module comprises a linear equalizer configured to perform linear equalization on a host equalized signal received from a host to create a module equalized signal. A driver configured to present the module equalized signal from the linear equalizer to an optic module at a magnitude suitable for the optic module, and an optic conversion device. The optical conversion device is configured to receive the module equalized signal from the driver, convert the module equalized signal to an optic signal, and transmit the optic signal over an optic channel. Also part of this embodiment is an interface configured to communicate supplemental equalizer settings from the optic module to the host and a memory configured to store the supplemental equalizer settings. The supplemental equalizer settings are based on the optic modules effect on a signal passing through the optic module. A controller is configured to control communication of the supplemental equalizer settings to the host. The host uses the supplemental equalizer settings to modify host equalizer settings such that the host equalizer performs pre-processing on an outgoing signal to create the host equalized signal.

In one embodiment, the supplemental equalizer settings modify the host equalizer settings. The host equalizer may comprise a feed forward equalizer. In one embodiment, the supplemental equalizer settings are stored in a look-up table with supplemental equalizer settings for two or more different temperatures or one or more different module age values. The supplemental equalizer settings may be generated during a testing process prior to connection of the optic module to the host, or during a training process after connection of the optic module to the host.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

FIG. 4A and FIG. 4B, collectively

FIG. 7A and FIG. 7B, collectively FIG. 7 illustrates an optic signal transmit and receive system according to one embodiment with a linear module communicating equalization settings to a host.

DETAILED DESCRIPTION

Figure 1:
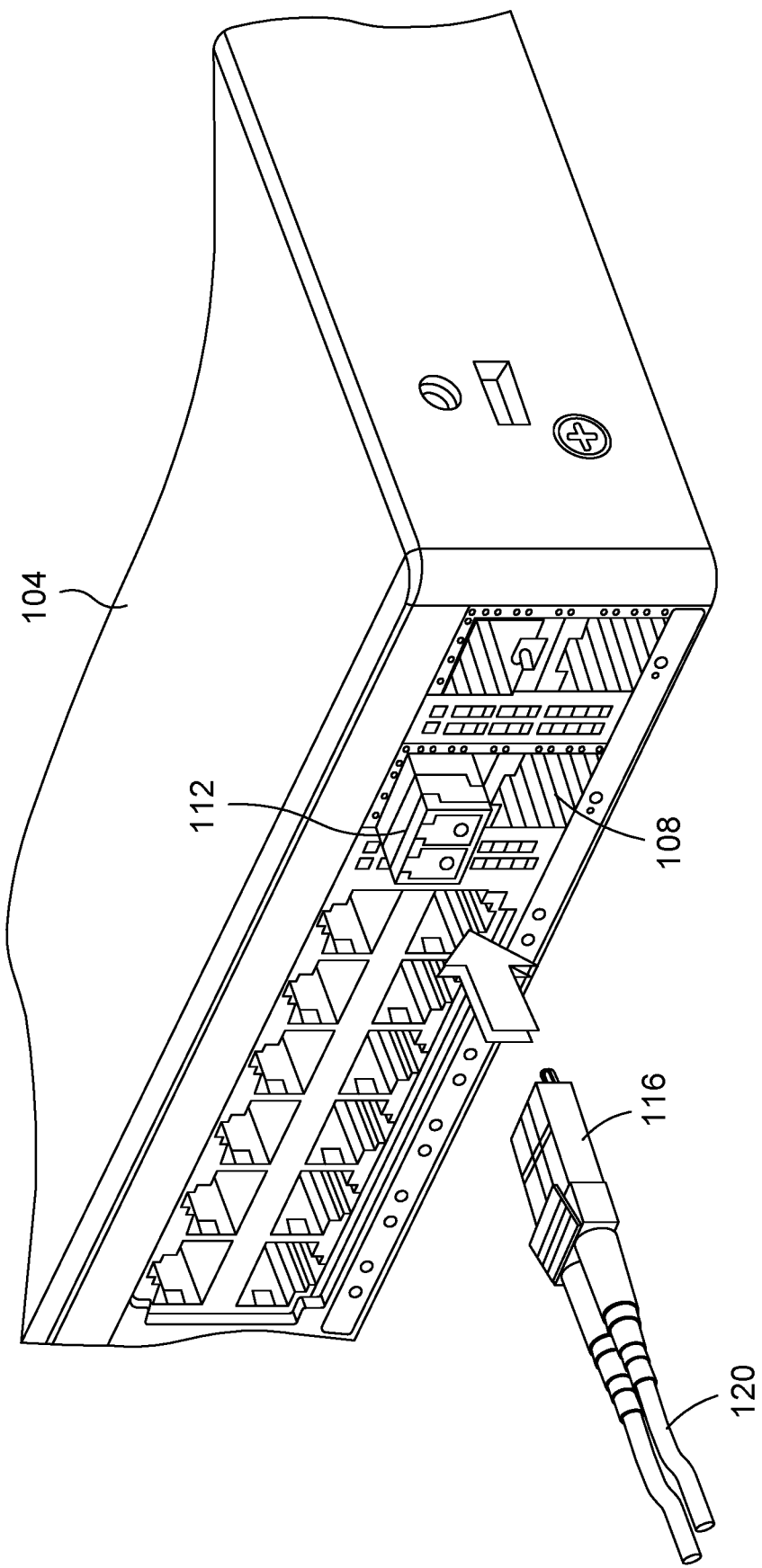
FIG. 1 illustrates an example environment of use of the innovation disclosed herein.

FIG. 1 illustrates an example environment of use of the innovations disclosed herein. As shown, a switch, router, computer, server or other electronic device, hereafter host 104 capable of data communication is provided with one or more ports 108 or slots. An optic module 112, is configured to slide into and electrically connect to the host 104 to effect data communication. Fiber optic cables 120, connect to the connector 116 to provide optical connectivity to the optic module 112 and host 104. In operation, a bi-directional optical link is used (transmit and receive). In the receive direction, the received optic signal from the fiber 120 is presented to the module 112 which in turn converts the optical signal to an electrical signal. The electrical signal is presented to the host 104. In the transmit direction, the transmitted electrical signal from the host 104 is presented to the module 112 which in turn converts the electrical signal to an optical signal for transmission over the connector 116 and fiber 120.

Figure 2:
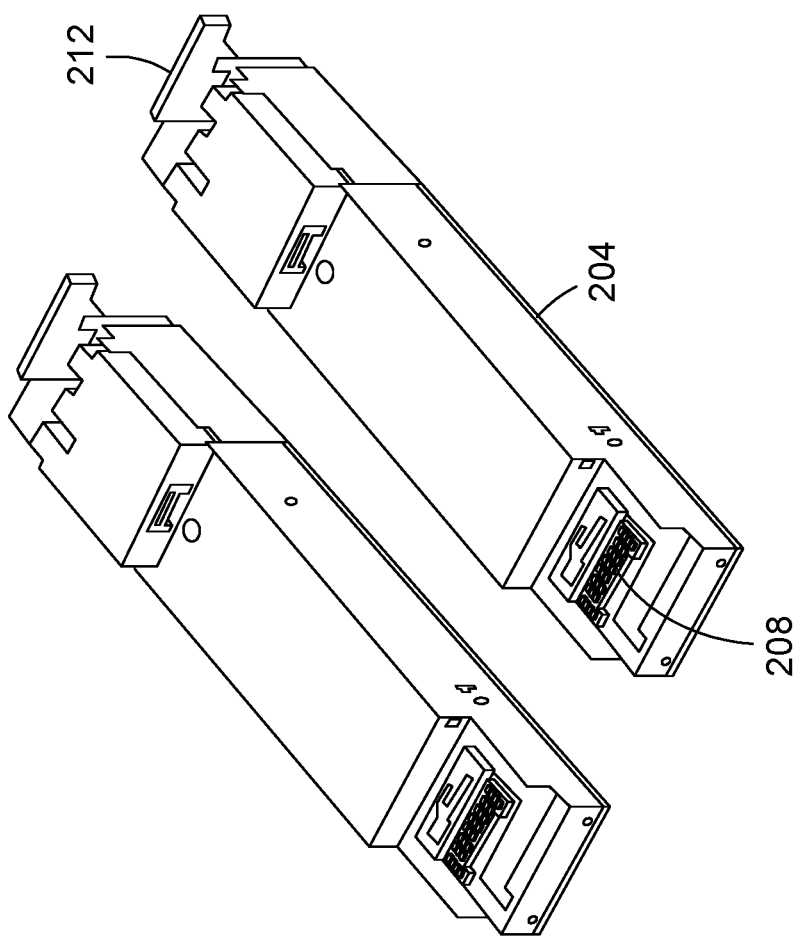
FIG. 2 is an exemplary optic module that slides into a data communication device (host).

FIG. 2 is an exemplary optic module 204 that slides into or otherwise connects to a data communication device, such as the host 104 shown in FIG. 1. The module 204 includes an electrical interface 208, that electrically connects a host, and an optic fiber interface 212 that optically connects to a fiber connector. The term module is defined herein to mean module and/or optical assembly.

Proposed is a linear interface for PAM (or any other signal type) optical modules in the transmit and/or receive direction for direct detect (non-coherent) applications with target reach less than 10 km primarily, but in other embodiments, applications of over 10 km are contemplated and feasible. The disclosed system is capable of operation over any distance and with any compatible technology and standard. These applications have the expected link margin and maintain the signaling supported by host ASICs (e.g., switch ICs), thereby eliminating the need for additional non-linear equalization or retiming and minimizing the cost/power for next generation systems. As a result, it is proposed to remove the DSP (non-linear equalization and retiming) from the optic module to avoid duplication of hardware and processing operations and instead utilized on the non-linear processing in the host, such as the host ASIC. It is also proposed to maintain and use only linear processing the optic module. This applies to the transmit path and/or the receive path. As disclosed, in one embodiment, the architecture is kept linear throughout the optical module while non-linear processing is reserved for the host.

In the receive path, host ASICs includes complex equalization schemes providing advanced equalization capability to compensate for passive copper loss which can be much greater than optical channels. The host is configured to interface with an optic fiber or an electrical cable. For example, with the optical transmitter being configured with a 5-tap or greater FFE, there is adequate margin for signal recovery in the receive path for applications that have reaches less than 10 km by keeping the optical module receive path linear so that the downstream ASIC can leverage its equalizer to the fullest. Current architectures have the optical module performing equalization, then retiming the signal at a minimum, resetting the signal integrity budget at the expense of power and cost, and limiting the amount of recovery the host ASIC can apply to just the local host trace.

Keeping the interface linear also enable end-to-end link optimization between ASICs using link training, which is broken when non-linear elements are in the path. End-to-end link optimization includes setting transmitters to optimal settings based on receiver metrics and presents another opportunity to further optimize the power consumed by the communication channel. The linear amplifier within optical modules can also be designed with optimal response taking into account the channel, dynamic range, and reference receiver metrics (such as bandwidth of interest), such that it eliminates noise/ISI beyond the spectrum of interest. As discussed below, variable gain functionality, such as in the optic module, allows the system to maintain target optical operating point while maintaining the accuracy and effectiveness of the operation of and changes to the ASIC transmitter equalizer settings.

Figure 3:
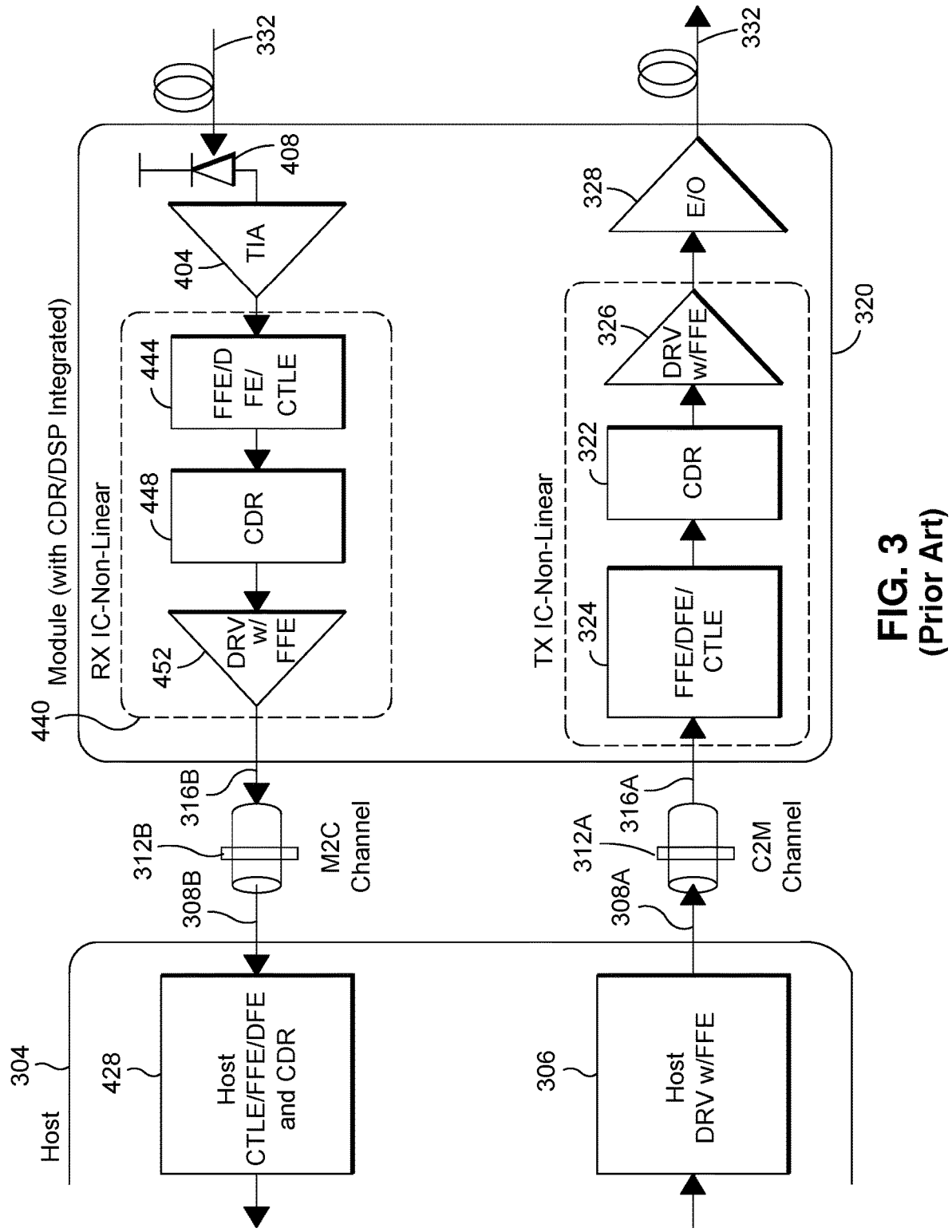
FIG. 3 illustrates a prior art optic signal transmit and receive system.

FIG. 3 illustrates a prior art optic signal transmit and receive system. As is understood in the art, the host and optic module typically include a transmit path with associated components and a receive path with associated components. As shown in FIG. 3, a host 304 provides an electrical signal to be transmitted to a host side electrical conductor(s) 308A that lead to a connector 312A. The connector 312A interfaces and connects the host 304 to the optic module 320. The connector 312A also electrically connects to an optic module electrical conductor(s) 316A. The optic module electrical conductor(s) 316A electrically connect and provide an electrical signal to an optic module component 320. Internal to the optic module component 320 is an equalizer system 324 that includes, in this embodiment, a feed forward equalizer (FFE) and a decision feedback equalizer (DFE) as well as a CTLE. It is understood that this functionality 324 is also located in the host equalizer 428. One or more of these elements perform non-linear processing on the signal.

The output of the optic module equalizer 324 connects to a CDR (clock and data recovery circuit) 322 and then to a laser driver 326, the output of which connects to an E/O (electrical to optical) converter (device) such as a TOSA/Laser 328. The TOSA/Laser 328 converts the electrical signal to an optic signal. The CDR is performing non-linear processing on the signal. The optic signal is output on an optic channel 332, such as fiber optic cable. During testing an exemplary scope-based transmitter evaluation system (not shown), which would emulate a reference receiver with equalization, was used to test and verify the transmit path met specification. In actual use, the opposing end of the optic cable 332 would connect to a remotely located receiver which would include an equalizer in the remote optic module and the remote host (not shown in FIG. 3). A reference equalizer (not shown) was used to evaluate the transmitters optical performance.

When discussing the receive path, shown at the top of FIG. 3, identical elements are labeled with identical reference numbers and are not described again. In this configuration of a receiver system, an optic signal is provided to the optic cable 332, and after passage through the fiber optic cable, is provided to a photo detector 408, which converts the optic signal to an electrical signal. The output of the photo detector 408 connects to a transimpedance amplifier (TIA) 404. As is understood in the art, the TIA 404 amplifies the electrical signal to a level suitable for subsequent processing. The output of the TIA 404 connects to a receiver integrated circuit (IC) 440. In this embodiment, the receiver IC comprises an equalization block 444 that includes one or more of the following: a FFE, a DFE, and CTLE, of which one or more perform non-linear processing on the signal. Thus, in the prior art, the equalization was non-linear thus making the equalization block 444 complex, expensive, large, and a significant power consuming element.

The output of the equalization block 444 feeds into a CDR (clock and data recovery) circuit 448 which is also non-linear, and the output of the CDR circuit 448 is provided to a driver with an optional FFE 453. The receiver IC 440 processes the received signal to recover the signal after the distorting effects of the channel.

The optic module 320 connects to the host 304 as discussed above through electrical channel elements 316B, 312B, 308B. The host 304 also includes the equalizer elements 428 as shown, which may include a CTLE, FFE, DFE and/or a CDR. One or more of the equalizer system components 440, 428 are non-linear due to the use of a slicer/retiming/clock and data recovery and the DFE in the host 304.

As can be appreciated, both the optic module 320 and the host 304 include equalizer systems, which is a duplication of functionality, and in turn increases costs, size, and power consumption, as well as creates an increase possibility for failure. For example, in the transmit path an equalizer functionality is found in the host DVR 306 as well as in the modules equalizer system 320. In the receive path, elements 440 and 428 are duplicative.

Figure 4:
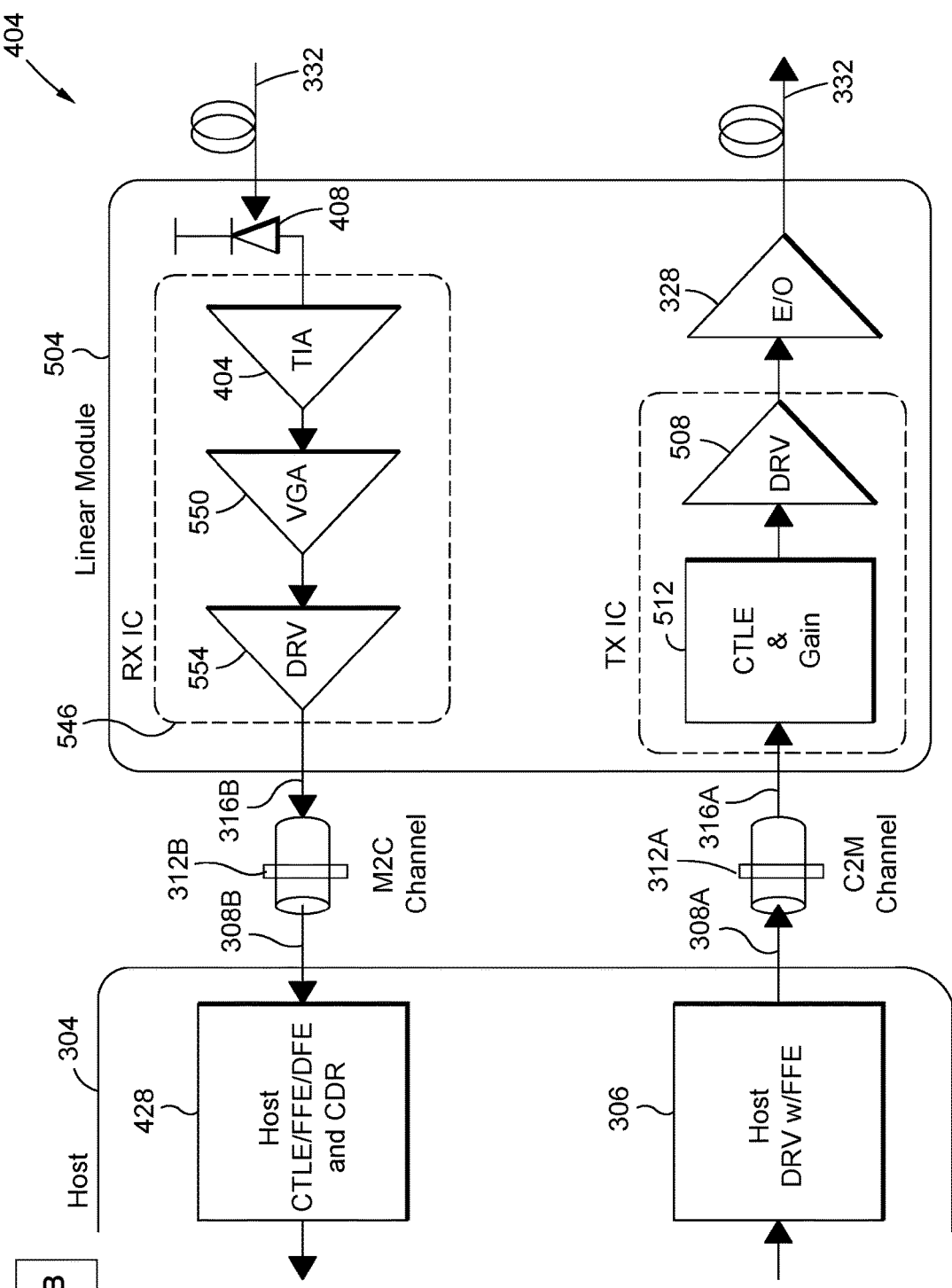
FIG. 4, illustrate an optic signal transmit and receive system according to one embodiment of the innovation.
Figure 4B:
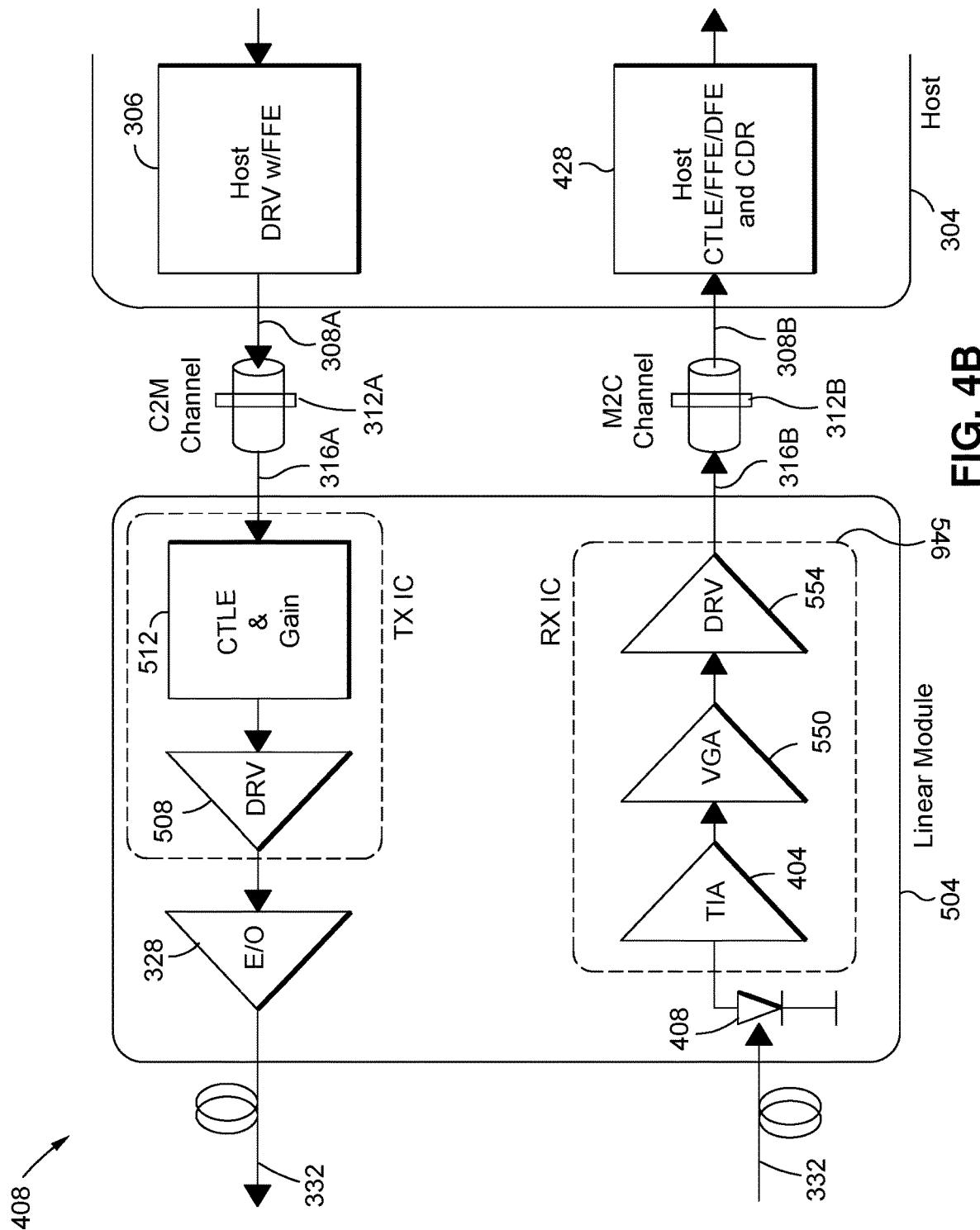

To overcome the drawbacks of the prior art and provide additional benefits, it is proposed to change the optic module from that shown in FIG. 3 to the embodiment of FIG. 4, which is a transmit and receive system according to one embodiment of the innovation. Comparing FIG. 4 to FIG. 3, identical elements are labeled with identical reference numbers and are not described again. In this embodiment, the optic module element 504 is configured with both transmit and receive path components. In FIG. 4, a first station 404 and second station 408 are shown to form a complete link path. Identical or similar elements at different stations 404, 408 are labeled with identical reference numbers. Thus, the TIA at the first station 404 is identified with an identical reference number as the TIA at the second station 408.

In the host is a driver with an FFE 306 which provides an electrical signal to the conductive path formed by elements 308A, 312A, 316A. The signal from the host 304 is provided in the transmit path to a linear CTLE unit 512 located in the optic module 504. The CTLE unit 512 is configured to perform continuous time linear equalization on the signal. A linear amplifier 508 receives the output of the CTLE 512 and performs linear amplification on the signal prior to conversion of the electrical signal to an optical signal by the TOSA/Laser 328. The resulting optic signal is provided on the optic channel 332 for transmission to a remote receiver. The optic channel 332 is referred to generally such that the transmit path and receive path may share and optic fiber or each path may have its own optic fiber. It is also contemplated that the driver (amplifier) 508 and equalizer 512 may be merged into a single element.

The linear amplifier 508, 512 may comprise any linear equalizer with any level of amplification, such as but not limited to a continuous time linear equalizer (CTLE), or any type of linear equalizer. The CLTE block may also include gain across all frequencies to increase the magnitude of the signal. The gain function may be part of the CTLE with gain block 512 or may be a separate element located either upstream or downstream of the CTLE. By removing the non-linear amplification/equalization/retiming/sampling from the optic module 504, the duplication between the optic module and the host 304 is reduced or eliminated. This saves space, reduces power consumption, and reduces costs. The equalization system 428 in the host 304 may be capable of processing the signal to remove or reverse the unwanted effects of the channel, thus making the duplication of equalizer components in the optic module 504 unnecessary. It should be noted that linear amplification is much less power demanding, less computationally complex, lower latency, less costly to implement, than non-linear equalization with retiming/sampling. Thus, system operation is achieved with fewer components, lower power consumption, lower cost, and reduced complexity as compared to the prior art. Note that the transmit path of the optic module does not include the non-linear CDR system and function.

Turning to the receive path in FIG. 4, shown by the upper path, an optic signal is received over an optic channel 332 and provided to a photodetector 408. The photodetector 408 converts the optic signal to an electrical signal. The resulting electrical signal is provided to the TIA 404 which amplifies and converts current output of the photodetector 408 to a voltage. The amplified voltage signal from the TIA 404 is provided to the variable gain amplifier (VGA) 550 which increases the voltage magnitude of the signal such that the amount of amplification is based on signal attenuation in the channel. The linear VGA amplifier 550 may comprise any linear amplifier or linear equalizer with any level of amplification, such as but not limited to a continuous time linear equalizer (CTLE), or any type of linear equalizer or linear amplifier. The output of the VGA 550 is provided to a driver 554 which sends the signal over the electrical conductors 308B, 312B, 316B as shown to the host equalizer 428. In this embodiment the host equalizer 428 includes one or more of the following: CTLE, FFE, DFE and CDR, at least one of which performs non-linear processing.

As discussed above, the processing within the receiver IC 546 is linear, thereby reducing complexity, cost, power, latency, and space consumption. The non-linear equalization and sampling occur within the host 428 and the host is configured with processing elements 428 which are capable of recording the received signal without need for non-linear processing in the optic module 504. This arrangement provides the benefit discussed herein while still providing ample processing for signal recovery based on the minimal processing which occurs in the receiver IC 546 and the more complex non-linear equalization occurs in the host equalizer 428, which may include a CLTE, FFE, DFE and clock/data recovery functions.

The linear amplification functionality in both the transmit path and receive path ensures target optical operating point while maintaining the fidelity of the changes in ASIC transmitter equalizer settings used in transmitter training.

Based on testing and system analysis, the complex non-linear equalizer and sampling in the optic module can be removed without significantly impacting performance. Replacing the non-linear equalization and sampling is a linear amplifier. Simulations performed using an equalizer in the host set up for a copper channel and an input signal that is stressed per the standard of 3.4 dB impairment was conducted. An analysis on the resulting processed signal occurred to determine how much penalty or hit to sensitivity (margin) occurred. Overall, the COM test results were very good with a minimal change in expected sensitivity. Hence, testing revealed that there is enough margin remaining to accurately recover the signal even when the non-linear equalization is removed from the optic module. Thus, the DSP equalizer function in the optic module may be removed for a small but acceptable change in signal quality from the optical module, keeping in mind the signal quality is still recoverable using non-linear equalization in the host.

Figure 5:
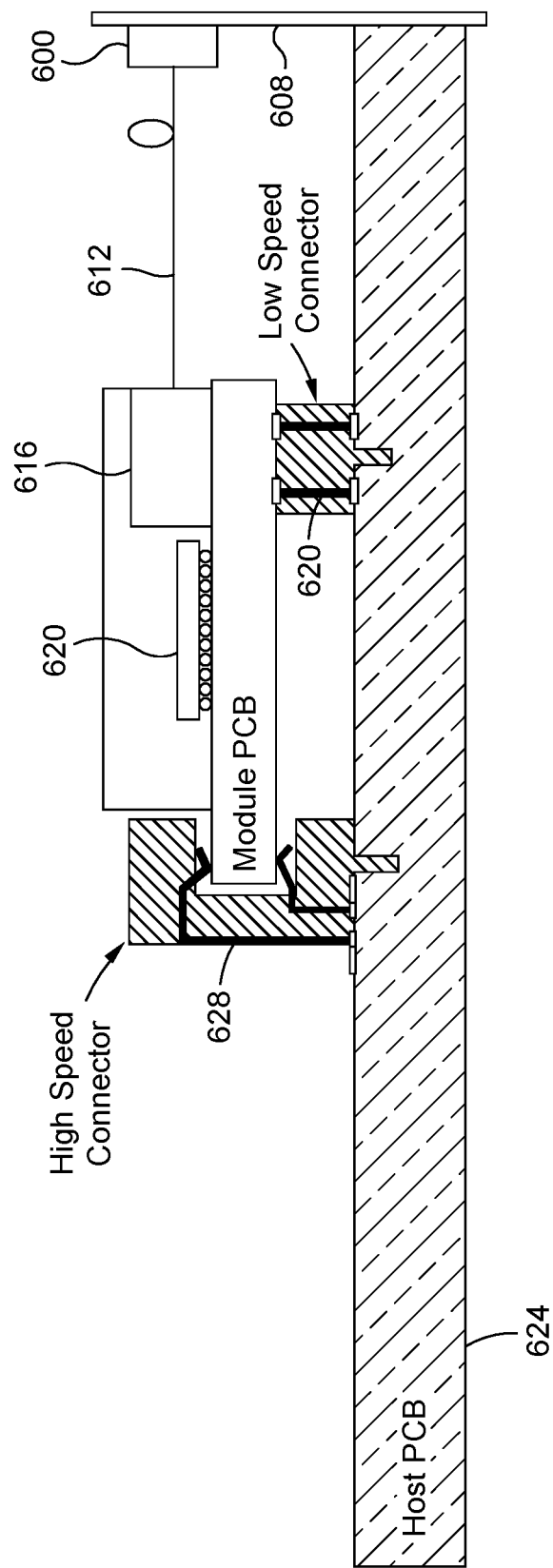
FIG. 5 illustrates an example embodiment of an on-board optics system, such as specified by the Consortium of Onboard Optics (COBO).

FIG. 5 illustrates an example embodiment of an on-board optics system, such as specified by the Consortium of Onboard Optics (COBO). It is contemplated that any system or arrangement disclosed herein may be utilized in an onboard optic module environment. COBO has developed an industry standard for high-bandwidth on-board optics. COBO has recently published the OnBoard Optical Module Specification, which includes standards for 400 Gbps and 800 Gbps capacity. The OnBoard Optical Module Specification is incorporated by referenced herein in its entirety. In this embedment a port 604 is provided on a faceplate 608 of a host. A fiber optic cable 612 connects to an O/E module 616 which converts the optical signal to an electrical signal. The electrical signal is provided to an optic module IC 620. A high-speed connector 628 and a low speed connector 632 communication signals between the optic module IC 620 and the host PCB 624. A host IC (not shown) is electrically connected to the host PCB 624. In this embodiment, and the embodiments of FIG. 7A, FIG. 7B and FIG. 7C, the optic module 504 of FIG. 4 is represented by the optic module IC 620.

Figure 6A:
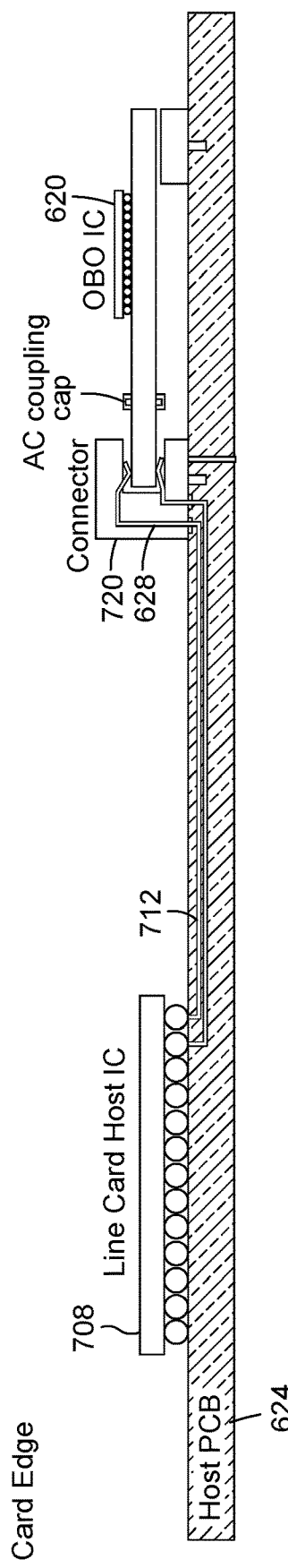
FIG. 6A, FIG. 6B, and FIG. 6C illustrate example configurations for host to optic module interfaces.
Figure 6B:
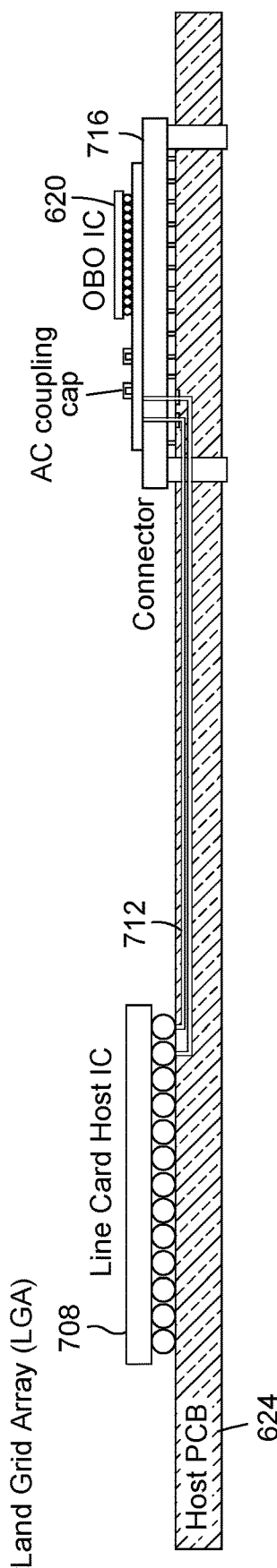
Figure 6C:
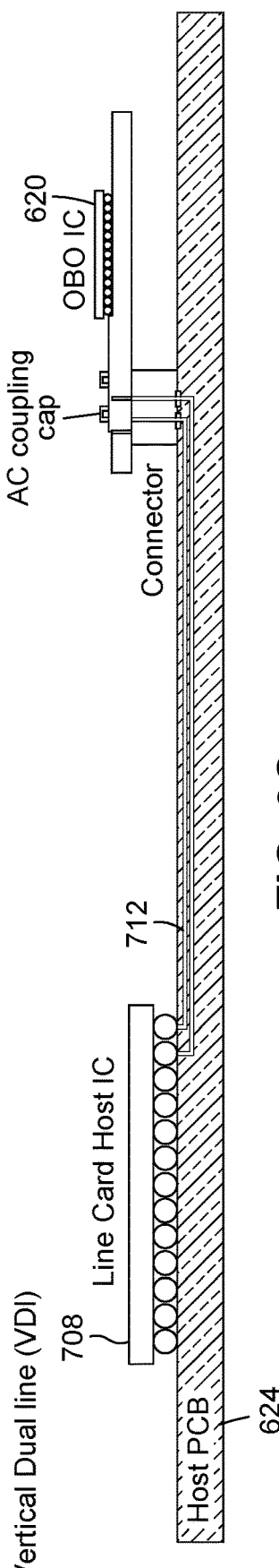

FIGS. 6A, 6B, and 6C illustrate example configurations for host to optic module interfaces. As compared to FIG. 5, similar or identical elements are labeled with identical reference numbers. In these various configurations, the host IC 708 performs the host processing, which may be non-linear equalization and other non-linear signal processing while the optic module IC 620 performs linear signal processing. Exemplary interconnects 712 within the host PCB 624 connect the host IC 708 to the optic module IC 620. Various OBO configurations are possible and shown. In FIG. 6A, the optic module IC 620 on the optic module PCB is inserted into a connector 720. This configuration may be referred to as a card edge configuration. In FIG. 6B, the optic module IC 620 mounts on a thin PCB which in turn connects to a socket 716. The socket 716 electrically connects to the host IC 708 through the host PCB traces 712. This configuration may be referred to as a land grid array configuration. In FIG. 6C, the optic module IC 620 and PCB are floating above the host PCB 624. This configuration may be referred to as a vertical dual line configuration.

With the ever-increasing speeds of networking technologies such as 400 Gigabit Ethernet, concerns have been raised about pluggable connector performance. Additionally, switch faceplates have a mechanical dimension limit for additional pluggable connectors. Both concerns are addressed under the COBO specification, which brings the connector on-board. Moving the optics away from the faceplate permits new and creative designs to support the higher thermal requirements of faster and larger radix switches. The COBO specification utilizes optical fiber as the recognized medium for high-speed, low-loss signal transmission and defines the characteristics of 8- and 16-lane On-Board Optics (OBOs) for use in up to 1×400 Gbps and 2×400 Gbps bandwidth capacity applications.

Also disclosed herein are one or more implementations for use with co-package optics and/or onboard optics embodiments. As discussed above, there are numerous benefits to co-packaged optics and/or onboard optics embodiments. The traditional optic module plugs into a host (element 104 in FIG. 1). A fiber optic cable plugs into optic port of the optic module. Internal to the optic module are processing elements, including a CDR which performs signal equalization and other elements which perform optic to electrical conversion.

To reduce the size, cost, and power consumption of the optic modules, co-package optics and/or onboard optics module (referred to herein after as a co-packaged optic modules) replace the optic modules of the prior art. As discussed below, the co-packaged optic module connects to fiber optic cables, which in this embodiment are ribbon cables terminated with an MPO connector. In this embodiment, the co-package optic module includes two or more lasers per module (often four lasers per module) and these lasers are shared across multiple fiber optic cables. The co-package optic module has the same number of channels and processing capability as four optic modules and has better future potential for further gains in processing power, space reduction, and reduced power consumption. The size of the co-packaged optic module is much smaller than the optic modules of the prior art. The innovation disclosed herein may be used with either pluggable optic modules, onboard optics, or co-packaged optics.

The innovation described herein may be used with a co-packaged optic module. In a co-packaged optic module system, a fiber optic cable carries an optic signal from a remote location to an optic module configured to convert the optical signal to an electrical signal. The photodetector in the optical module provides an electrical signal representing the optic signal to a TIA which is then communicated to the DSP to recover the signal prior to communicating over XSR channel to the host. In the transmit path, the DSP performs non-linear retiming prior to communicating the transmit data to the driver which then amplifies the electrical signal and provides the swing required for OE conversion. The PD, TIA driver and DSP form the co-packaged optic module. The DSP element processes the electrical signal to compensate for unwanted effects of the XSR channel in the transmit path and optical receive data in the receive path. DSP may include equalization and other complex channel compensation processing including retiming/sampling. The output of the DSP element is routed through the XSR channel and into a switch die. The switch die performs switching and rerouting on all the incoming packets. Operation of the switch die is known by those of skill in the art and as such is not described in detail herein. The system may also include the package substrates, ball connectors, and a PCB substrate.

This prior art embodiment suffered from duplication of the DSP in each co-packaged optic module as well as in the switch die. Even if a DSP is not located in the switch die, the numerous optic modules with discrete DSP's establish a large number of expensive, space and power consuming DSP modules.

Also disclosed is a co-packaged optic module with an improved design that locates the DSP in the shared switch die and removes a DSP from each of the numerous co-packaged optic modules. In this embodiment, the package substrate is part of the optic module. In this embodiment, a DSP is located in the switch die and redundant sampling functionality is no longer provided in each of the numerous co-packaged optic modules. The processing capability of the switch die is shared between multiple co-packaged optic modules. By removing the DSP from the co-packaged optic module and establishing a DSP in the shared switch die, the number of sampling elements are greatly reduced. Further, the cost to integrate the DSP on the switch die is less than the cost to establish a similarly capable DSP in every optic module.

In this embodiment, the communication path from the TIA and driver element within the package substrate is a direct drive link, and thus a non-retimed C2M/XSR interface. The processing path from the optic module to the switch die up to the processing by the DSP may be made to have linear throughput in both directions. Thus, the electrical to optical and optical to electrical conversion is linear. Maintaining a linear interface provides the benefit that the non-linear CDR/sampling/equalization processing can occur in one place (within the switch die), which yields further cost, space, and power savings.

This innovation may be implemented with any type signal processing or encoding scheme, including PAM applications. PAM encoding includes higher order modulation and necessitates a more complicated and complex system to recover the signal. This in turn increases power consumption, heat generation, cost, and size of the required CDR system (typically performed within the DSP) to support higher bit and baud rates. By moving the DSP to the ASIC (switching die) duplication of processing elements is reduced and implementation costs on the more capable ASIC are reduced as compared to an implementation that separately implements a DSP in each pluggable optic module. The cost of placing the DSP or other processing capability in the switch die (host) is less than if similar elements were configured as separate discrete dies as shown by DSP in the module. Using the proposed configured disclosed herein, the entire DSP die in the optic module is eliminated.

The benefits and advantages discussed above also apply the co-packaged optic embodiments or prior art pluggable modules. While the length of the channel or path between the TIA and driver element to the DSP die is potentially longer, thus suffering a small penalty in signal quality, the DSP located in the switch die is more than capable of performing the additional signal recovery tasks due to this this additional short signal path distance. Also disclosed is a direct driver embodiment and reduces optical module size and density, lowers complexity and cost was well as lowers system power.

The content of U.S. Provisional Patent Application 62/959,744 titled Optimal Equalization Partitioning filed on Jan. 10, 2020, is incorporated by reference herein for all purposes. The content of U.S. Provisional Patent Application 63/076,863 titled Optimal Equalization Partitioning filed on Sep. 10, 2020, is incorporated by reference herein for all purposes. Any incorporation by reference of documents above is limited such that no subject matter is incorporated that is contrary to the explicit disclosure herein. In the event of inconsistent usages between this document and those documents so incorporated by reference, the usage in the incorporated reference(s) should be considered supplementary to that of this document; for irreconcilable inconsistencies, the usage in this document controls.

Also disclosed is a host device configured with multiple co-packaged optic modules. As shown, one or more switch dies are located on a substrate. Two or more co-packaged optic modules are located on the package and communicate with the switch dies through the substrate such as through ball grid array (flip-chip) below the switch dies and the co-packaged optic modules. Fiber optic cables (ribbon cables) connect to each co-packaged optic module.

In this example embodiment, there are two switch dies shared between eight co-packaged optic modules. This reduces the number of non-linear sampling elements by half (DSP function removed from co-packaged optic module). This is a significant reduction in space, power consumption, complexity, heat generation, and cost. Based on testing, existing DSPs located in the switch dies have ample processing power and are capable of performing the processing on the signal from each co-packaged optic module.

As discussed above, co-packaged optic module and switch dies share the processing power of the switch die, which is located on a substrate. Multiple co-packaged optic modules are located on the substrates. In this embodiment, a one or more DSPs are on the switch die. By integrating the DSP function with the switch, co-packaged optical modules improve in density, and overall system power consumption is reduced by centralizing nonlinear sampling functionality.

There is also a benefit realized by placing the DSPs on the switch die because the size and geometry of the switch die (ASIC) is such that to add these DSPs adds very little cost and certainly much less costs than a separate DSP in each optic module. Thus, this embodiment removes the PHY from the optical module, and integrates the line side DSP into the switch. The switch die (ASIC) with the DSP therein is capable of driving the substrates interconnect to the TIA/Driver and has processing power to compensate for the entire signal path. Overall, this facilitates high density integration of photonics in optical devices.

It is contemplated that operational speed (bit rate and baud) may be any currently existing speed or those speeds developed in the future. This may be 100 GB/S, 200 GB/S or any other bit rate or baud. In addition, any signaling, and coding scheme may be implemented with this innovation.

Figure 7B:
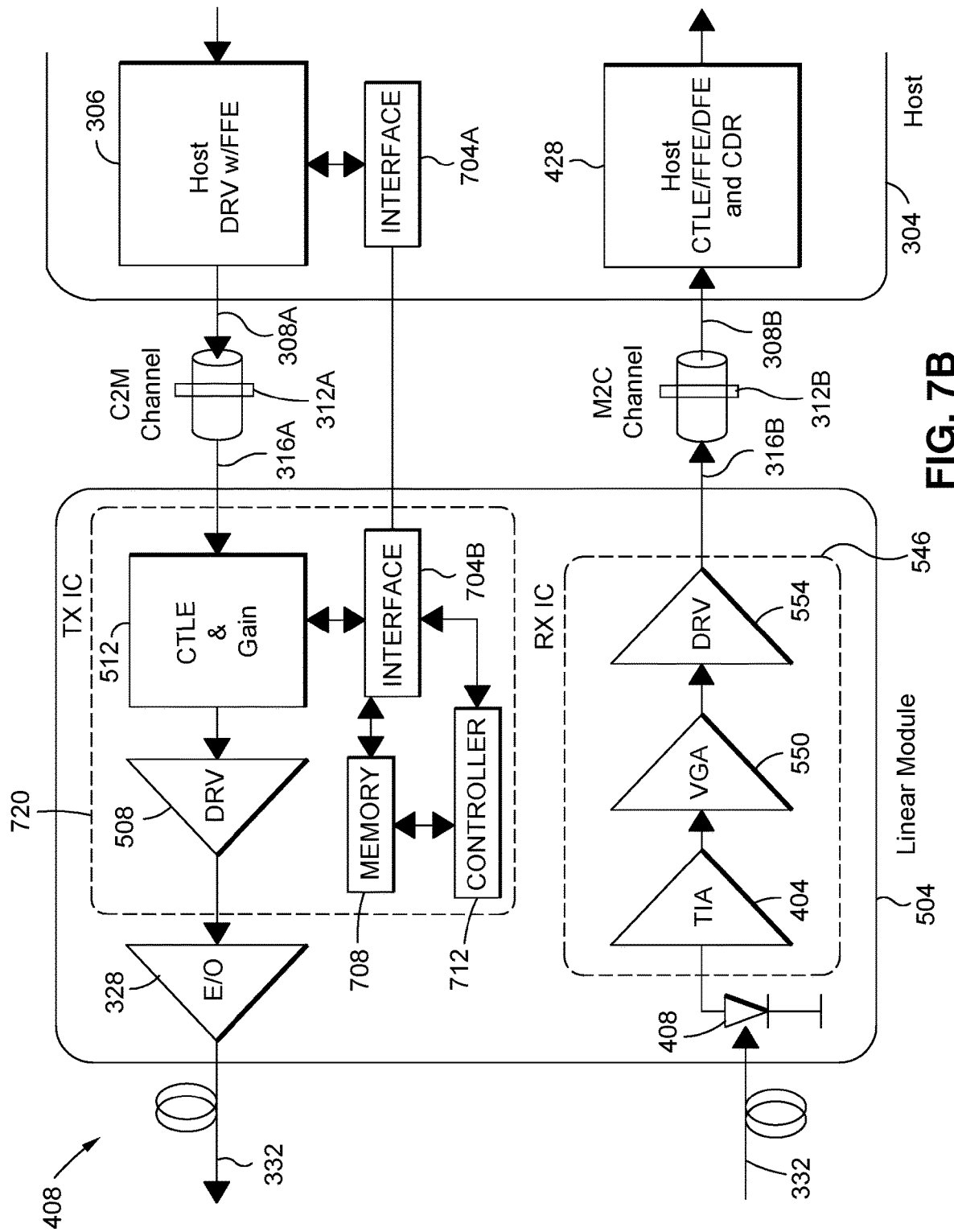

FIG. 7A and FIG. 7B illustrate an optical signal transmit and receive system according to one embodiment with a linear module communicating equalization settings to a host. To overcome one drawback of linear modules and provide additional benefits, disclosed is a linear module which includes FFE settings to be provided to the FFE in the host module. As shown in FIG. 7A, the linear module is configured with an interface 704B that establishes communication between the host 306 and an interface 704A in the linear module 504. The interface may be any type interface, including but not limited to, a I2C or SPI type interfaces. The interface may be a separate path, as shown, or implemented with the primary data channel path 308A, 312A, 316A. In the prior art, data exchange with regard to optimal equalization settings for the optical output 332 from the module to the host over the interface 704A, 704B did not occur.

Also part of this embodiment is a controller 712 and memory 708, one or more of which are in communication with the interface. The controller 712 may be any type of controller, processor, microcontroller, microprocessor, or other control element configured to function as described herein. The memory 708 may comprise any type non-volatile memory or register arrangement configured to store data and/or machine executable instructions in a non-transitory state. The memory 708 may be accessed by the controller 712 or directly by the interface 704B. The content of the memory 708 is discussed below in greater detail.

At the time of manufacture or subsequent thereto during a testing and configuration stage, the transmit path 720 and 328 of the linear module 504 is subject to testing to characterize the transfer function of the linear module. The testing may occur with a BERT type test equipment. During testing, signals are provided to the transmit path 720 and the input signal is compared to the output signal to determine the effect of the transmit path on the signal. Based on this testing, supplemental FFE settings are calculated and stored in the memory 708. The supplemental FFE settings may be calculated by the test equipment, a computer or processor in communication with the test equipment, or by the controller 712. The supplemental FFE settings are stored in the memory 708 for use during future operation as discussed below.

It is also contemplated that the testing may occur at different temperatures and the supplemental FFE setting may be established, by testing at the various temperatures. The set of supplemental FFE settings may be stored in the memory 708, such as in a look-up table. Alternatively, an algorithm may be executed by the controller 712 to calculate or adjust a base set of FFE settings. The look-up table with the supplemental FFE settings for various temperatures are stored in the memory 708 for use during future operation as discussed below. Likewise, a set of different FFE settings may be established by testing or a calculation based on the changes to the transmit path, which includes the electrical to optical device 328, to account for aging of the optical module.

It is also contemplated that the supplemental FFE settings may be generated during a training phase at the time of initial operation. A remote system, such as shown in FIG. 7B, may communicate with the linear module 504 and/or host 304 to determine optimal supplemental FFE settings during a training process. The training may occur during start up or periodically during operation. The training generated supplemental FFE settings are stored in the memory 708.

The system shown in FIGS. 7A and 7B is bi-directional, and as such it is contemplated that the same system would be placed at the opposing terminal. Operation of the system at the opposing terminal is generally similar or identical to the system described above. Operation of the system is described below in connection with FIG. 9.

Figure 8:
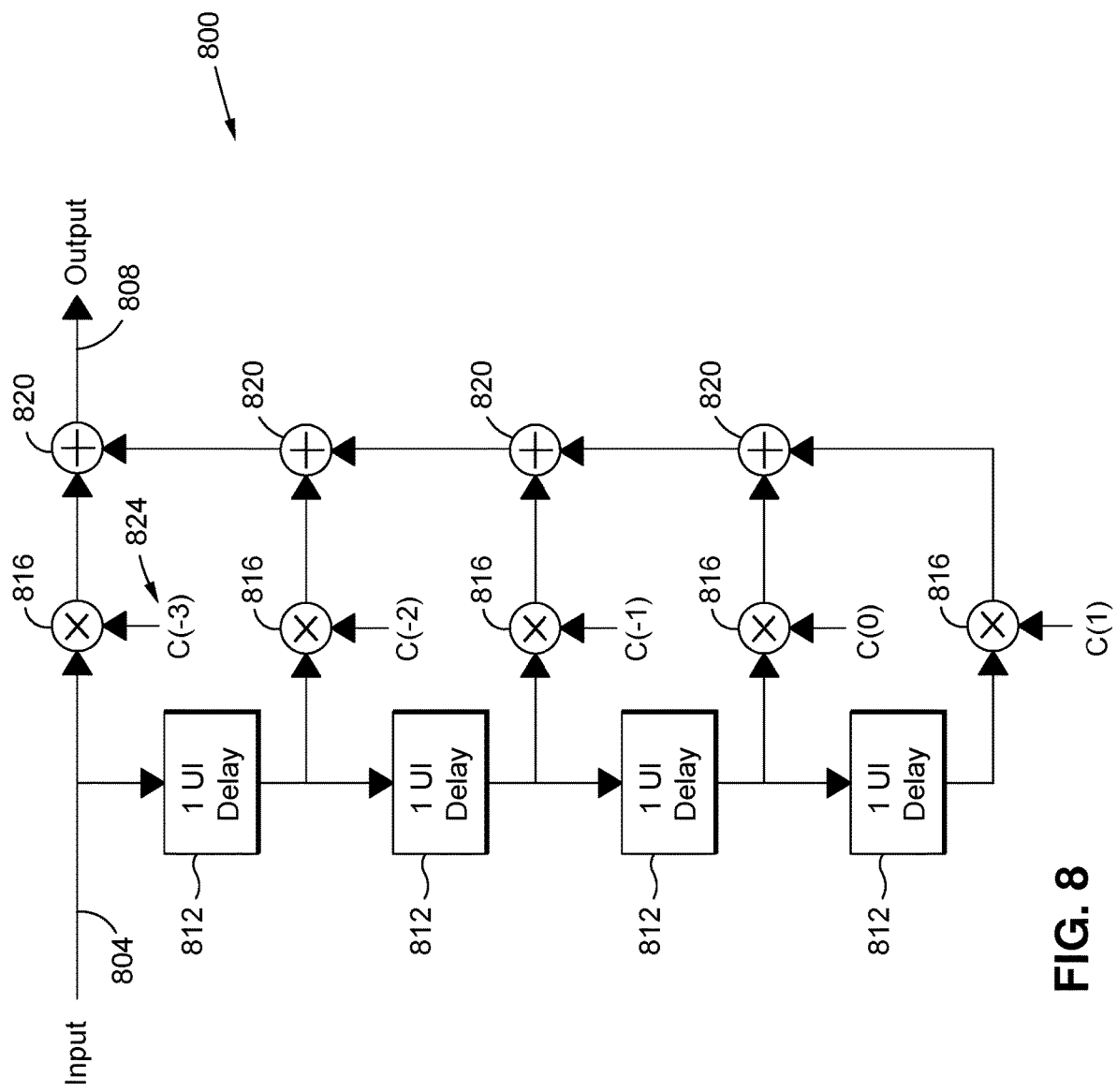
FIG. 8 illustrates an example embodiment of a feed-forward equalizer (FFE).

FIG. 8 illustrates an example embodiment of a feed-forward equalizer (FFE) that is in the host. This is but one example embodiment of a feed forward equalizer (FFE). Other configurations and number of taps are contemplated. In this embodiment, a 5 tap configuration is shown, but other FFE configurations may be implemented. An input 804 is configured to receive an input signal. The input signal is provided to a cascading set of delays 812 as shown, and to a multiplier 816. Each delay 812 has an output connects to another delay, as well as to a multiplier 816 as shown. The multipliers 816 all receive a coefficient that is a value by which the input to the multiplier is multiplied to generate a tap output. For example, the first multiplier receives a coefficient value 824 and each coefficient may be different. The coefficients of the FFE determine the modifications to the signal presented to the FFE. The coefficients are influenced by the supplemental FFE coefficients to further improve the pre-processing performed on the data signal prior to transmission over the fiber optic cable.

The output of each multiplier 816 is provided to a summing junction 820 as shown and each summing junction combines its inputs. The combined signal from all summing junctions 820 is provided on an FFE output 808. The FFE would be the FFE in the host driver/FFE element 306.

Figure 9:
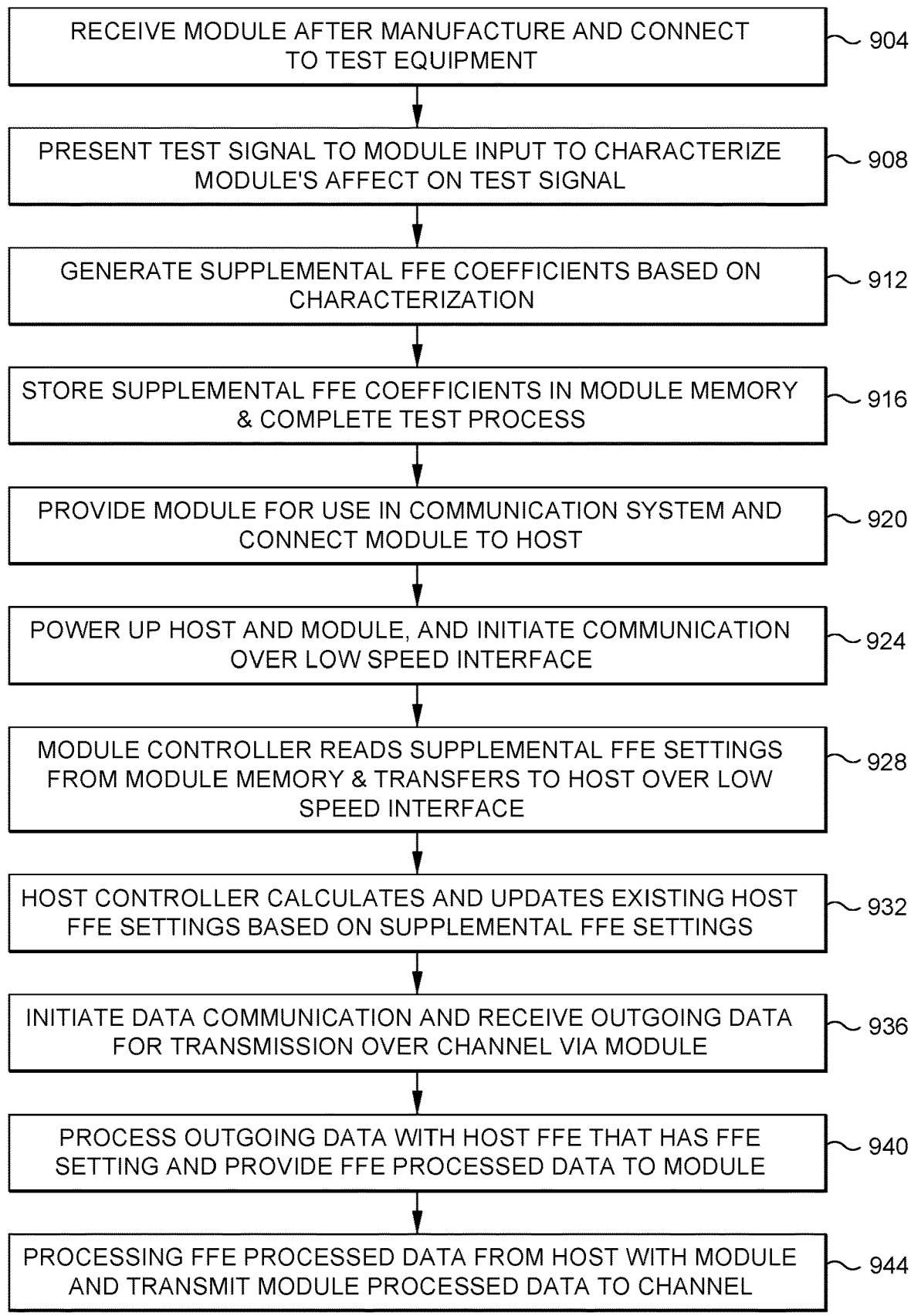
FIG. 9 illustrates an operational flow chart of an exemplary method of operation.

FIG. 9 illustrates an operational flow chart of an exemplary method of operation. This is but one possible method of operation, and as such other methods of operation are contemplated that do not depart from the claims that follow. This method covers the overall process of testing the module to characterize the module, updating the host FFE (or any other/additional equalization/pre-processing elements) with the module specific signal path parameters, and processing outgoing data with the host FFE (or any other/additional equalization/pre-processing elements) that incorporate the module specific signal path parameters. Although described herein in relation to updating host FFE settings (coefficients or other values), it is disclosed that other pre-distortion (pre-compensation) may occur in the host to pre-distort the signal to account for the unwanted affects of the module. For example, any type of pre-equalization may occur. In addition, phase changes to pre-compensate for skew may be introduced in the host based on measurements from module.

In FIG. 9, step 904 the module is received after manufacturing for testing and configuration. The purpose of the testing is to determine supplemental FFE settings. These settings are based on how the modules affect on a signal pass therethrough. These setting are used to adjust supplemental pre-processing performed by the host FFE. At a step 908, a test signal is presented to the input of the module to characterize or determine the module's affect on a received signal. As understood in the art, a module, or any type electronic device, will modify an input signal as the input signal passes through the module to its output. This may be referred to as a device transfer function or its time or frequency response.

At a step 912, the module, test equipment, external processor, or combination thereof, monitor the module's output signal in relation to the known input to generate supplemental FFE coefficients (or other data defining the response of the module to the test signal(s)). At a step 916, the supplemental FFE coefficients (or similar data) is stored in the module's memory and the testing process is completed. By storing this data in the memory of the module, the data that defines the module's frequency response (transfer function) travels with the module as the module is provided to customers and end users for use with a host, which at the time of testing and manufacture is unknown to the host.

At a step 920, the module is provided for use in a communication system and is connected to a host, such as by plugging the module into a host port and a connecting an optical cable to the module. This process is generally known in the art and as such not described in detail. Then, at a step 924, the host and module are powered up and communication between the host and the module over the low-speed interface. This communication is primarily for set up and not data communication. At a step 928, the module controller reads the supplemental FFE settings from the module memory and transmits the supplemental FFE settings through the interface to the host. At a step 932, the host controller calculates the updates to the existing host FFE settings based on the supplemental FFE settings. In one embodiment, supplemental FFE settings from the module are added to the existing host FFE settings to establish the FFE settings (coefficients) based on the signal path through the host and module. This tailors the pre-distortion of the FFE to counter act the unwanted effects of the host and the module. In other embodiments, a different type combination of the supplemental FFE settings and the host FFE settings may occur such as when the host is using other forms of equalization/pre-distortion to complement FFE style equalization.

At step 936, data communication is initiated over the channel (such as but not limited to an optical channel). As such the host receives and processes outgoing data for transmission over the channel. At a step 940, the FFE within the host processes (such as with pre-distortion) the outgoing data and provides the processed data to the module over the high-speed channel that connects the host and the module. Although described in terms of an FFE, any system may benefit from the innovation disclosed herein in addition to or instead of the FFE. Any type of pre-processing system may be used. At a step 944, the module processes the FFE processed data from the host and transmits the module processed data to the channel. In this embodiment, the module is a linear module and as such it does not include a retiming element, thereby allowing any pre-distortion or modification to the signal which occur in the host to affect the signal which is transmitted on the optical channel.

Other systems, methods, features and advantages of the invention will be or will become apparent to one with skill in the art upon examination of the following figures and detailed description including but not limited to optics on board applications. It is intended that all such additional systems, methods, features, and advantages be included within this description, be within the scope of the invention, and be protected by the accompanying claims.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A transmit path comprising:
    a host having one or more equalizers configured to perform equalization on an outgoing signal;
    a host to optic module channel electrically connecting the host to an optic module;
    the optic module electrical connected to the host via the host to optic module channel, the optic module comprising:
        a transmitter comprising:
            a linear equalizer configured to perform linear equalization on the outgoing signal to create an equalized signal;
            a gain unit configured to perform variable linear amplification on the equalized signal to create an amplified signal wherein the gain unit automatically adjusts gain to maintain target modulation amplitude based on transmit host settings;
            a driver configured to receive and output the amplified signal; and
            an electrical to optical device configured to convert the amplified signal from the driver to an optical signal, and transmit the optical signal over a fiber optic cable.

2. The transmit path of claim 1 wherein the host is configured to training of the equalizers in the host and the optic module for link optimization including linear processing within the optic module.

3. The transmit path of claim 1 wherein the linear equalizer is further configured to automatically adjust the equalization to maintain target optical operating point host settings from initial host evaluation or dynamic training.

4. The transmit path of claim 3 wherein equalizer settings of the one or more equalizers in the host do not have to be adjusted or retrained in response to changes in the channel due to the automatic adjustment of the gain, equalization, or both within the optic module.

5. The transmit path of claim 1 wherein the gain unit is part of the linear equalizer in the optic module.

6. The transmit path of claim 1 wherein the optic module does not include a CDR configured to perform non-linear clock and data recovery, and the transceiver operates at 25 Gb/s or more.

7. The transmit path of claim 1 wherein the automatic adjustment by the linear equalizer is frequency specific gain.

8. A signal transmit path, within an optic module, configured to perform linear processing on an outgoing signal comprising:
    a gain and equalization unit configured to perform linear amplification, linear equalization, or both on the outgoing signal received from a host to create a processed outgoing signal, wherein the gain and equalization unit automatically adjusts gain, equalization or both to maintain target operating point while maintaining previously established host equalizer settings; and a driver configured to transmit the processed outgoing signal to the channel.

9. The transmit path of claim 8 wherein further comprising a linear equalizer configured to perform linear equalization.

10. The transmit path of claim 8 further comprising an electrical to optical interface configured to:

receive the processed outgoing signal from the driver;
convert the processed outgoing signal to an outgoing optic signal; and
transmit the outgoing optic signal on the channel, the channel comprising a fiber optic cable.

11. The transmit path of claim 8 wherein the host includes an equalizer configured to perform non-linear equalization to create the outgoing signal.

12. The transmit path of claim 8 wherein the optic module does not include non-linear clock and data recovery.

13. The transmit path of claim 8 wherein the optic module is configured in an on-board optic configuration.

14. The transmit path of claim 8 wherein the optic module is configured in a co-packaged optic configuration.

15. The transmit path of claim 8 wherein the optic module is configured to process outgoing electrical signals.

16. A transmitter, having a transmit path, the transmit path comprising:

a host having one or more equalizers configured to perform equalization on an outgoing signal to create an equalized signal;
a host to optic module channel connecting the host to an optic module;
an optic module, connected to the host via the host to optic module channel, the optic module comprising a transmitter configured to receive the equalized signal, the transmitter comprising:
　a gain unit configured to perform linear amplification on the equalized signal to create an amplified signal wherein the gain unit automatically adjusts gain to maintain target optical operating point while maintaining settings of the one or more equalizers in the host
　an equalizer configured to perform linear equalization on the amplified signal to create an equalized amplified signal wherein the equalizer automatically adjusts equalization to maintain target optical operating point while maintaining the settings of the one or more equalizers in the host;
　an electrical to optical device configured to convert the equalized amplified signal to an optical signal, and transmit the optical signal over a fiber optic cable.

17. The transmitter of claim 16 wherein equalizer settings of the one or more equalizers in the host do not have to be retrained in response to changes in the channel due to the automatic adjustment of the gain, equalization, or both within the optic module.

18. The transmitter of claim 16 wherein the optic module does not include a CDR configured to perform non-linear clock and data recovery and the transceiver operates at 25 Gb/s or more.

19. The transmitter of claim 16 wherein the optic module is configured to also process received electrical signals and transmit electrical signals over an electrically conductive channel.

20. The transmitter of claim 16 wherein the automatic adjustment of the gain is frequency specific.

* * * * *

UNITED STATES PATENT AND TRADEMARK OFFICE
CERTIFICATE OF CORRECTION

| | | |
|---|---|---|
| PATENT NO. | : 12,375,176 B2 | Page 1 of 1 |
| APPLICATION NO. | : 18/424600 | |
| DATED | : July 29, 2025 | |
| INVENTOR(S) | : Ryan Latchman | |

It is certified that error appears in the above-identified patent and that said Letters Patent is hereby corrected as shown below:

In the Claims

• Column 1, Line 28, please delete "200G" and insert -- 200 Gb/s --, therefore.

• Column 2, Line 20, please delete "opic" and insert -- optic --, therefore.

Signed and Sealed this
Thirtieth Day of September, 2025

John A. Squires
*Director of the United States Patent and Trademark Office*